Feb. 3, 1931.  H. A. MORRIS  1,791,141
TRANSMISSION
Filed Sept. 28, 1929  2 Sheets-Sheet 1

Inventor
Howard A. Morris
By Owen & Owen
Attorneys

Feb. 3, 1931. H. A. MORRIS 1,791,141
TRANSMISSION
Filed Sept. 28, 1929 2 Sheets-Sheet 2
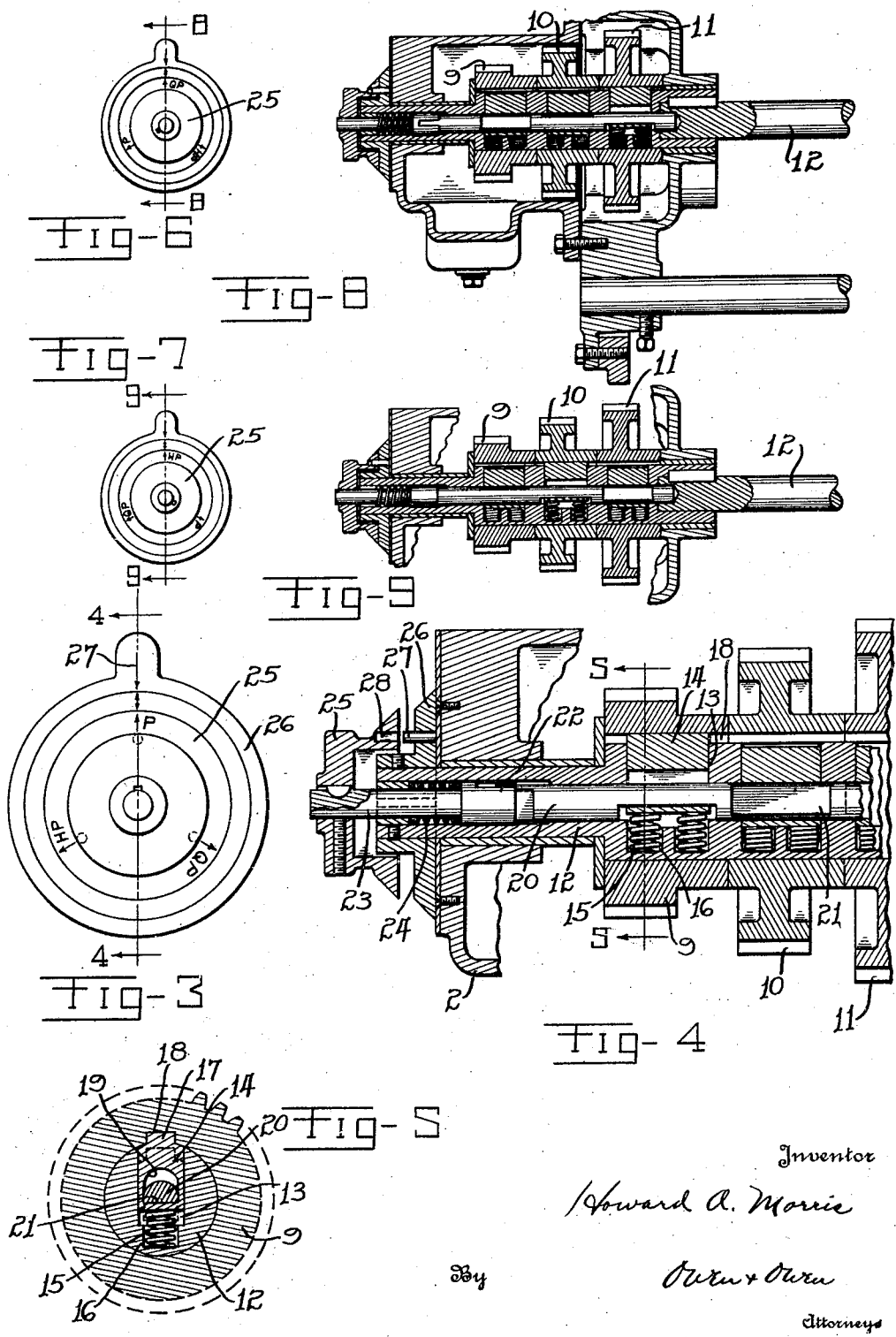

Patented Feb. 3, 1931

1,791,141

UNITED STATES PATENT OFFICE

HOWARD A. MORRIS, OF TOLEDO, OHIO, ASSIGNOR TO THE AUTOMAT MOLDING & FOLDING COMPANY, OF TOLEDO, OHIO, A CORPORATION OF OHIO

TRANSMISSION

Application filed September 28, 1929. Serial No. 395,872.

This invention relates to power transmitting mechanism and an object is to provide a simple and efficient transmission in which the driving and driven members are constantly in engagement and in which change in ratio or speed of operation may be effected whether the machine is idle or in operation, thereby eliminating the necessity of moving the members relative to each other to obtain the desired speed or manner of operation.

Other objects and advantages will hereinafter appear and the invention is shown by way of illustration in the accompanying drawings in which—

Figure 1:
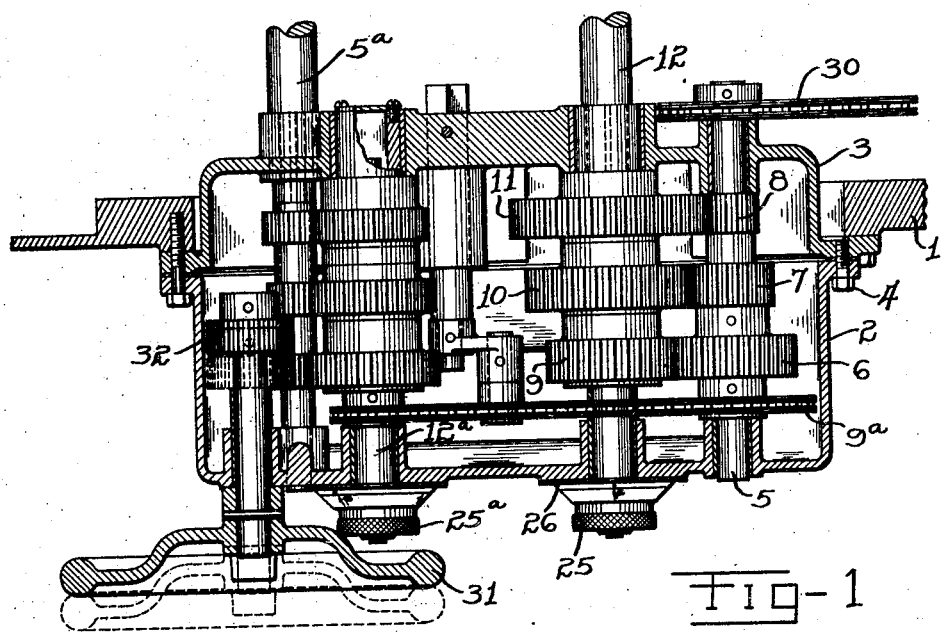
Figure 2:
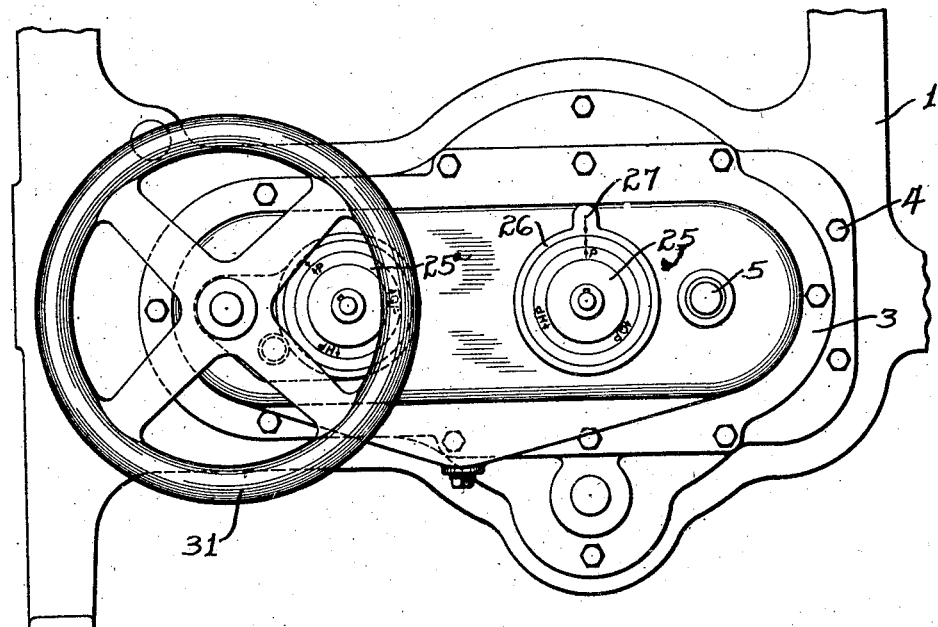

Figure 1 is a top plan view of the transmission with top or cover plate removed; Fig. 2 is an end elevation of the outside of the casing for the mechanism; Fig. 3 is an end elevation of a dial adjusted for one pound prints; Fig. 4 is a longitudinal sectional view on the line 4—4 of Fig. 3 showing the parts in position for packaging one pound prints of butter or the like; Fig. 5 is a section on the line 5—5 of Fig. 4 showing a detail of the clutch; Figs. 6 and 7 are end elevations of a dial adjusted respectively for packaging quarter and half pound prints; and Figs. 8 and 9 are sections on the lines 8—8 and 9—9 respectively of Figs. 6 and 7 showing views the parts assume where adjustments have been accordingly made.

The illustrated embodiment of this invention comprises a transmission which for purposes of illustration but not of limitation will be described in connection with its adaptation or use in connection with a machine for wrapping and packaging prints or bars of butter, oleomargarine, or materials of like form and consistency. Machines of this character are old in the art and reference is made to the patent of John P. Aldrich and Howard A. Morris, No. 1,624,203 dated April 12, 1927.

It is desirable in these machines that certain adjustments be effected so that it may be operated for packaging one-quarter pound bars, half-pound bars or one pound bars. As will hereinafter appear this invention provides a transmission which can be readily and conveniently manipulated or adjusted whether the machine is idle or in operation to cause the speed and ratio of operation to be in accordance with that desired. It is not considered necessary for a proper understanding of this invention to give a more detailed description of the machine as above mentioned, because the following will clearly point out one application of the invention sufficient to enable those skilled in this art to practice the same.

Referring to the drawings, secured to the machine frame 1 is a transmission casing composed of the parts 2 and 3 which are secured together and to the frame 1 by suitable bolts 4. Having bearings in the transmission casing is a driving shaft 5 on which are secured three different sized driving gears 6, 7 and 8. Power is imparted to the shaft 5 through a sprocket and chain connection $9^a$ as will hereinafter appear.

The driving gears 6, 7 and 8 mesh respectively with driven gears 9, 10 and 11 which are coaxial with and mounted on a driven shaft 12. It will be observed that the gears 9, 10 and 11 are of different sizes. The shaft 12 is free from the gears 9, 10 and 11 which are rotatable independently thereof.

Formed in the shaft 12 are a plurality of sockets 13, one socket being provided for each of the gears 9, 10 and 11. Arranged within each socket 13 is a clutch key 14 which is movable radially of the shaft 12. Each clutch key 14 is urged outwardly of its socket 13 by a pair of coiled springs 15 disposed in sockets 16, thereby tending to force a reduced clutching end 17 into a keyway 18 formed in the adjacent driven gear. It will thus be apparent that provided in sockets in the driven shaft 12 are clutch keys individual to each of the driven shafts 9, 10 and 11 and spring means constantly urges the keys into clutching relation with the driven gears.

In the illustrated embodiment of the invention all of the clutch keys 14 are retained out of engagement with the driven gears except one which is released to enable the springs to snap it into clutching position. As shown, each key 14 is formed with a longitudinal opening 19 which is substantially rectangular in shape except the upper side (Fig. 5) which is rounded. Extending through the registering openings 19 of the clutch keys is a control rod or shaft 20, openings also being provided in the driven shaft 12 to accommodate this control rod and afford bearings therefor.

The control rod 20 is formed with a series of cam surfaces 21, one being provided for each clutch key 14, and these cam surfaces are arranged at different angles. As shown on the drawings, the three cam surfaces 21 on the rod 20 for controlling the clutch keys for the driven gears 9, 10 and 11 are so arranged that one or another of the clutch keys 14 may be released to operatively engage the respective gear which the remaining clutch keys may be positively retracted from clutching position.

The control shaft 20 has a tongue and groove connection 22 with an extension 23, a coiled spring 24 surrounding the extension and being so mounted as to urge the extension inwardly into engagement with the control shaft 20. Secured to the outer end of the extension 23 on the outside of the transmission casing is a dial 25 which is normally held by the spring 24 in engagement with a disc 26. Displayed on the outside of the dial 25 are the letters "P", "HP" and "QP" indicating respectively pound, half pound and quarter pound.

An index 27 is provided on the disc 26 and in adjusting the dial 25 one or another of the letters are brought into register with the index in order to operatively connect the gears for obtaining the proper ratio of operation. In the region of the index 27 is an outwardly extending pin which may extend into one of the slots 28, one slot being provided in the dial for each of the numbers. This insures that the proper adjustment will be made when the dial is turned to the desired position with respect to the index 27.

It will readily be apparent from the above that when the dial is turned to one of the three positions designated thereon, one of the driven gears will be operatively connected to the driven shaft. Figs. 3, 4 and 6 to 9 show the result of adjusting the dial 25 to the positions mentioned. In Fig. 3 the dial is turned so that "P" registers with the index 27 and in this position, the control rod 20 is so positioned that the clutch key 14 for the driven gear 9 is released while the remaining clutch keys are held out of engagement with the gears. In Fig. 4, the dial 25 is shown pulled out of engagement with the disc 26 prior to completing the adjustment, the disc 26 rotating with the shaft 12.

In Fig. 7 the dial has been adjusted so that the transmission operates properly for packaging half pound bars and, as shown in Fig. 9, the driven gear 10 is clutched to the driven shaft 12. Similarly Fig. 6 shows the dial 25 adjusted to the quarter pound position in which, as shown in Fig. 8, the driven gear 11 is clutched to the shaft 12. Any of the above adjustments may be made while the machine is in operation or when it is idle.

The above described arrangement may be said to control the ratio of operation of the bar feeding mechanism of the machine, it being understood that the shaft 12 may be connected to operate such mechanism. Power is also taken off of the driving shaft 5 by the sprocket and chain connection 30 for operating other parts of the machine. It is apparent that in view of the difference in gear ratio, the speed of the shaft 12 relative to the driving shaft 5 is changed by the above described adjustment of the dial 25.

It is desirable to vary the speed of operation of driving shaft 5 at the time the above described adjustments are effected. For example, when the dial is adjusted for quarter pound operation, the speed should be increased in order to facilitate the packaging operation and when pound adjustment is made, the machine should operate at a slower rate of speed. For this purpose a similar gear arrangement (the gears however being chosen of different sizes for obvious reasons) is provided in which a similar clutch arrangement is employed. It is considered sufficient to point out that a dial $25^a$ controls a driven shaft $12^a$ and a driving shaft $5^a$ connected to a suitable source of power, the gears on the driving and driven shafts being constantly in mesh. The clutch arrangement and operation is as above described. In this instance, the sprocket and chain connection $9^a$ is connected to the driven shaft $12^a$ so that the change in speed of the driven shaft $12^a$ is imparted to the driving shaft 5. It will thus be apparent that when the dial 25 is adjusted a similar adjustment of the dial $25^a$ is made so that the speed of operation of the first described gear arrangement is properly regulated and this may be effected while the machine is in operation or idle.

A handle wheel 31 having a pinion 32 enables manual adjustment of the parts when desired.

It is to be understood that altho this invention has been described in connection with a machine for wrapping and packaging bars of butter and the like, it is not limited thereto but is adapted for use in a variety of machines, for example, it may be used to particular advantage in any gear driven machine tool or with some slight modification may be used as an automobile transmission. Numerous changes in details of construction, arrangement and operation may be effected without departing from the spirit of the invention.

What I claim is:

A transmission comprising a set of continuously rotatable driving gears, a common power means for operating said driving gears, a set of driven gears constantly in mesh with said driving gears respectively, a driven shaft co-axial with said driven gears and about which such gears are free to rotate, a non-shiftable rod co-axial with said driven shaft, cam surfaces on said rod individual to each driven gear, there being sockets in said driven shaft individual to each driven gear, a spring tensioned clutch element in each socket engageable with said cam surfaces respectively, said cam surfaces being so constructed and arranged that all except one clutch element are held out of operative engagement with their respective driven gears, and manually operable means for returning said cam rod for selectively connecting one or another driven gear with said driven shaft.

In testimony whereof I have hereunto signed my name to this specification.

HOWARD A. MORRIS.